United States Patent
Chen et al.

(10) Patent No.: US 12,452,552 B2
(45) Date of Patent: Oct. 21, 2025

(54) IMAGE SENSOR AND IMAGE PROCESSING SYSTEM

(71) Applicant: OmniVision Sensor Solution (Shanghai) Co., Ltd, Shanghai (CN)

(72) Inventors: Shoushun Chen, Shanghai (CN); Menghan Guo, Shanghai (CN)

(73) Assignee: OmniVision Sensor Solution (Shanghai) Co., Ltd, Shanghai (CN)

( * ) Notice: Subject to any disclaimer, the term of this patent is extended or adjusted under 35 U.S.C. 154(b) by 132 days.

(21) Appl. No.: 18/381,244

(22) Filed: Oct. 18, 2023

(65) Prior Publication Data

US 2024/0048859 A1 Feb. 8, 2024

Related U.S. Application Data (63) Continuation of application No. PCT/CN2021/090429, filed on Apr. 28, 2021.

(30) Foreign Application Priority Data

Apr. 20, 2021 (CN) .......................... 202110425391.1

(51) Int. Cl.
*H04N 25/47* (2023.01)
*H04N 25/709* (2023.01)

(52) U.S. Cl.
CPC ........... *H04N 25/47* (2023.01); *H04N 25/709* (2023.01)

(58) Field of Classification Search
CPC .... H04N 25/47; H04N 25/709; H04N 25/707; H04N 25/78; H04N 25/70; H04N 25/75
See application file for complete search history.

(56) References Cited

U.S. PATENT DOCUMENTS

| | | | |
|---|---|---|---|
| 2014/0192206 A1* | 7/2014 | Holz | H04N 23/651 348/169 |
| 2016/0187196 A1* | 6/2016 | Kim | G06F 3/0304 250/206.1 |
| 2016/0203610 A1* | 7/2016 | Lee | G06V 40/16 382/103 |
| 2018/0032150 A1* | 2/2018 | Lee | G06F 1/3262 |

(Continued)

FOREIGN PATENT DOCUMENTS

| | | |
|---|---|---|
| CN | 102695042 A | 9/2012 |
| CN | 108462842 A | 8/2018 |

(Continued)

*Primary Examiner* — Albert H Cutler
(74) *Attorney, Agent, or Firm* — IPRO, PLLC (57) ABSTRACT

Disclosed are an image sensor and an image processing system. The image sensor at least includes: a pixel collection circuit array, an activity detection unit, a low-power control unit, and a reading unit. The pixel collection circuit array is composed of a plurality of pixel collection circuits, and the pixel collection circuits monitor a light intensity change in a field of view and enter a trigger state when the light intensity change satisfies a certain conditions. The activity detection unit monitors a current value on a global activity detection signal line, and sets a low-activity enable signal to be valid when the current value is smaller than an activity threshold. The low-power control unit sets a global low-power enable signal to be valid when the low-activity enable signal is valid. The reading unit is reset when the global low-power enable signal is valid.

15 Claims, 6 Drawing Sheets

(56) References Cited

U.S. PATENT DOCUMENTS

| | | | | |
|---|---|---|---|---|
| 2018/0189959 A1* | 7/2018 | Berner | ................... | H04N 25/47 |
| 2020/0154064 A1 | 5/2020 | Berner et al. | | |
| 2021/0152762 A1* | 5/2021 | Sakakibara | ............ | H04N 25/47 |
| 2023/0412917 A1* | 12/2023 | Hunt | ................... | H04N 25/707 |

FOREIGN PATENT DOCUMENTS

| | | | |
|---|---|---|---|
| CN | 109274896 | A | 1/2019 |
| CN | 110536083 | A | 12/2019 |
| CN | 111510650 | A | 8/2020 |
| CN | 112153309 | A | 12/2020 |

\* cited by examiner

IMAGE SENSOR AND IMAGE PROCESSING SYSTEM

TECHNICAL FIELD

The present disclosure relates to the technical field of image collection, and particularly relates to an image sensor.

BACKGROUND

Detection of moving objects plays an important role in various application fields of image sensors. In the application field, a dynamic vision image sensor (hereinafter, referred to as a dynamic vision sensor) has attracted more and more attention because of its unique advantages compared with a traditional image sensor (for instance, an active pixel sensor).

For a pixel unit (or a pixel collection circuit) designed according to a bionic principle, the dynamic vision sensor can continuously respond to a light intensity change in a field of view in real time without any exposure time. In this way, a high-speed moving object can be detected more easily. In addition, the dynamic vision sensor only responds to an area having the light intensity change in the field of view and outputs position information of its corresponding pixel unit. Further, it automatically shields useless background information. In view of this, it is less in output data and small in bandwidth occupation. With the above-mentioned characteristics of the dynamic vision sensor, an image processing system at a back end can directly obtain and process useful dynamic information in the field of view. Therefore, its requirements for storage and computing power are greatly reduced, and better real-time performance can be achieved.

The pixel unit needs to continuously monitor the light intensity change in the field of view, so it needs to be in a working state all the time and consume electric energy. Without dynamic information in the field of view, the pixel unit only consumes a certain static power consumption. With dynamic information in the field of view, the pixel unit consumes dynamic power consumption in addition to its static power consumption. The dynamic power consumption includes not only dynamic power consumption consumed by a peripheral control circuit of a pixel array for reading and managing the pixel unit, but also dynamic power consumption consumed by an output interface of the dynamic vision sensor during data transmission. In some application scenes of the dynamic vision sensor, for instance, in the field of video monitoring, no movement may occur in the field of view for a long time, and movement information that needs to be detected may exist only in a short time. When no effective movement occurs in the field of view, that is, little useful dynamic information exists in the field of view, the dynamic vision sensor will still output some stray noise data. It includes both thermal noise interference of the dynamic vision sensor itself and some data wrongly generated due to slow change of a background light intensity or relative movement between the dynamic vision sensor and background.

Therefore, it is significant to effectively identify a case having little dynamic information and reduce overall power consumption of the image processing system in this case.

An existing identification method is based on a back-end algorithm. That is, the amount of data output from the dynamic vision sensor is analyzed with the back-end algorithm, such that its working state is controlled. Although this method can control static power consumption of a pixel unit array in a low-power mode, it cannot reduce dynamic power consumption. Moreover, a back-end processing system also needs to work continuously to determine and identify the low-power mode. These operations undoubtedly increase overall power consumption of the image processing system. Therefore, certain limitations exists in reducing the overall power consumption of the system according to the back-end algorithm.

Based on the above description, a novel image sensor and image processing system are required to solve the above-mentioned problems.

SUMMARY

The present disclosure provides an image sensor, so as to solve or at least alleviate at least one of the above-mentioned problems.

An aspect of the present disclosure provides an image sensor. The image sensor includes: a pixel collection circuit array composed of a plurality of pixel collection circuits, where the pixel collection circuits are suitable for monitoring a light intensity change in a field of view and entering a trigger state when the light intensity change satisfies a certain conditions; an activity detection unit coupled to the pixel collection circuit array via a global activity detection signal line, and suitable for monitoring a current value on the global activity detection signal line and setting a low-activity enable signal to be valid when the current value is smaller than an activity threshold, where the current value is positively correlated to the number of the pixel collection circuits in the trigger state in the pixel collection circuit array; a low-power control unit having one end coupled to the pixel collection circuit array and a reading unit via a global low-power enable signal line and the other end coupled to the activity detection unit, and suitable for setting the global low-power enable signal to be valid when the low-activity enable signal is valid; and the reading unit coupled to the pixel collection circuit array and the low-power control unit separately and suitable for being reset when the global low-power enable signal is valid.

Alternatively, the image sensor according to the present disclosure further includes a global control unit coupled to the pixel collection circuit array via a global reset signal line, and suitable for resetting the pixel collection circuit array when the image sensor is powered on, and conducting reset releasing when the pixel collection circuit array remains in a stable initial state, such that the pixel collection circuit array starts to work.

Alternatively, in the image sensor according to the present disclosure, the pixel collection circuit includes: a photoelectric detection module suitable for monitoring an optical signal emitted to the photoelectric detection module in real time and outputting a corresponding electrical signal; a trigger generation module suitable for generating a trigger signal when the electrical signal satisfies a threshold condition; a latch suitable for being set when the trigger signal is received; and a logic module including a handshake protocol control logic and a self-timing reset logic, where the self-timing reset logic is activated when the pixel collection circuit enters a self-timing working mode. The latch is further suitable for being reset after the pixel collection circuit remains in the trigger state for a period of time in the self-timing working mode.

Alternatively, in the image sensor according to the present disclosure, the trigger generation module includes: a filter amplifier suitable for filtering and/or amplifying the electrical signal and generating a processed electrical signal; and a threshold comparison sub-module suitable for generating the trigger signal when the processed electrical signal satisfies the threshold condition. The threshold comparison sub-module includes a first comparator, a second comparator, and an OR gate. In addition, the global activity detection signal line is set to be a power line or a ground line of the OR gate and a power line or a ground line of the latch, so as to monitor dynamic currents on the OR gate and the latch.

Alternatively, in the image sensor according to the present disclosure, the pixel collection circuit further includes: a gated current source including a current source and a switch controlled by an output signal of the latch. When the latch is set, the switch in the gated current source is switched on, and a current of the current source flows through the global activity detection signal line. When the latch is reset, the switch in the gated current source is switched off, and a current of the current source does not flow through the global activity detection signal line.

Alternatively, in the image sensor according to the present disclosure, the self-timing reset logic includes: a second phase inverter having one end connected to an output end of the latch and the other end connected to a gate electrode of a third transistor; the third transistor and a first capacitor, where a source electrode of the third transistor and a lower pole plate of the first capacitor are both grounded, and a drain electrode of the third transistor and an upper pole plate of the first capacitor are both connected to a third current source; the third current source having the other end connected to a power supply; and a third phase inverter and a fourth phase inverter connected in sequence, where the other end of the third phase inverter is connected to the upper pole plate of the first capacitor, and the other end of the fourth phase inverter outputs a self-timing reset output signal.

Alternatively, in the image sensor according to the present disclosure, the gated current source includes: a first current source having one end connected to a drain electrode of a first transistor and the other end connected to a power supply; and the first transistor having a gate electrode connected to an output end of the latch and a source electrode connected to the global activity detection signal line.

Alternatively, in the image sensor according to the present disclosure, the gated current source includes: a first phase inverter having one end connected to an output end of the latch and the other end connected to a gate electrode of a second transistor; the second transistor having a source electrode connected to the global activity detection signal line; and a second current source having one end connected to a drain electrode of the second transistor and the other end grounded.

Alternatively, in the image sensor according to the present disclosure, the activity detection unit includes: a current adapter having one end connected to the global activity detection signal line and the other end connected to a current mode comparator, and suitable for clamping the global activity detection signal line at a fixed level and copying a current signal on the global activity detection signal line and outputting the current signal to the current mode comparator; and the current mode comparator having a positive input end connected with an activity threshold signal and a negative input end connected with the current signal, and suitable for setting the low-activity enable signal to be valid when the current signal is smaller than the activity threshold signal.

Alternatively, in the image sensor according to the present disclosure, the activity detection unit includes: a current adapter having one end connected to the global activity detection signal line and the other end connected to a current mode analog-digital converter, and suitable for clamping the global activity detection signal line at a fixed level and copying a current signal on the global activity detection signal line and outputting the current signal to the current mode analog-digital converter; the current mode analog-digital converter suitable for converting the current signal into a digital signal; and a digital comparator having a positive input end connected with an activity threshold signal and a negative input end connected with the digital signal, and suitable for setting the low-activity enable signal to be valid when the digital signal is smaller than the activity threshold signal.

Alternatively, in the image sensor according to the present disclosure, the activity detection unit includes: a current adapter having one end connected to the global activity detection signal line and the other end connected to a current-voltage converter, and suitable for clamping the global activity detection signal line at a fixed level and copying a current signal on the global activity detection signal line and outputting the current signal to the current-voltage converter; the current-voltage converter suitable for converting the current signal into a voltage signal; and a voltage mode comparator having a positive input end connected with an activity threshold signal and a negative input end connected with the voltage signal, and suitable for setting the low-activity enable signal to be valid when the voltage signal is smaller than the activity threshold signal.

Alternatively, in the image sensor according to the present disclosure, the activity detection unit includes: a current adapter having one end connected to the global activity detection signal line and the other end connected to a current-voltage converter, and suitable for clamping the global activity detection signal line at a fixed level and copying a current signal on the global activity detection signal line and outputting the current signal to the current-voltage converter; the current-voltage converter suitable for converting the current signal into a voltage signal; a voltage mode analog-digital converter suitable for converting the voltage signal into a digital signal; and a digital comparator having a positive input end connected with an activity threshold signal and a negative input end connected with the digital signal, and suitable for setting the low-activity enable signal to be valid when the digital signal is smaller than the activity threshold signal.

Alternatively, in the image sensor according to the present disclosure, the activity detection unit is further suitable for setting the output low-activity enable signal to be invalid when the current value is not smaller than the activity threshold; the low-power control unit is further suitable for setting the global low-power enable signal to be invalid when the low-activity enable signal is invalid; the pixel collection circuit array is further suitable for quitting the self-timing working mode when the global low-power enable signal is invalid; and the reading unit is further suitable for conducting reset state releasing when the global low-power enable signal is invalid, so as to respond to the pixel collection circuit in the trigger state, and outputting event data of the triggered pixel collection circuit.

Another aspect of the present disclosure provides an image processing system. The image processing system includes: the above-mentioned image sensor; and a computing device coupled to the image sensor and suitable for processing event data from the image sensor.

In the image sensor according to the present disclosure, the activity detection unit is added and coupled to the pixel collection circuit array through the global activity detection signal line. The activity detection unit may determine the amount of dynamic information in the field of view, that is, activity information of the field of view, by measuring the current value on the global activity detection signal line. When the field of view is low in activity and less in dynamic information, the low-power control unit enables the image sensor to enter a low-power mode, and the image sensor monitors the dynamic information in the field of view by itself with low power consumption. This monitoring does not depend on reading of the event data by the reading unit and computation of a back-end algorithm, such that image power consumption is reduced.

BRIEF DESCRIPTION OF DRAWINGS

To achieve the above-mentioned and related objectives, some illustrative aspects are described herein in connection with the following description and the accompanying drawings, which indicate various ways of implementing the principles disclosed herein, and all aspects and their equivalents are intended to fall within the scope of the claimed subject matter. The above-mentioned and other objectives, features and advantages of the present disclosure will become clearer with reference to the following detailed description in conjunction with the accompanying drawings. Throughout the present disclosure, like reference numerals generally refer to like components or elements.

FIGS. 3A-3E show an instance of a workflow of an image sensor 200 according to an example of the present disclosure.

DETAILED DESCRIPTION OF THE EMBODIMENTS

Illustrative examples of the present disclosure will be described in more detail below with reference to the accompanying drawings. Although the illustrative examples of the present disclosure are shown in the accompanying drawings, it should be understood that the present disclosure may be implemented in various forms and should not be limited to the examples illustrated herein. Rather, these examples are provided such that the present disclosure can be understood more thoroughly and the scope of the present disclosure can be fully conveyed to those skilled in the art.

Figure 1:
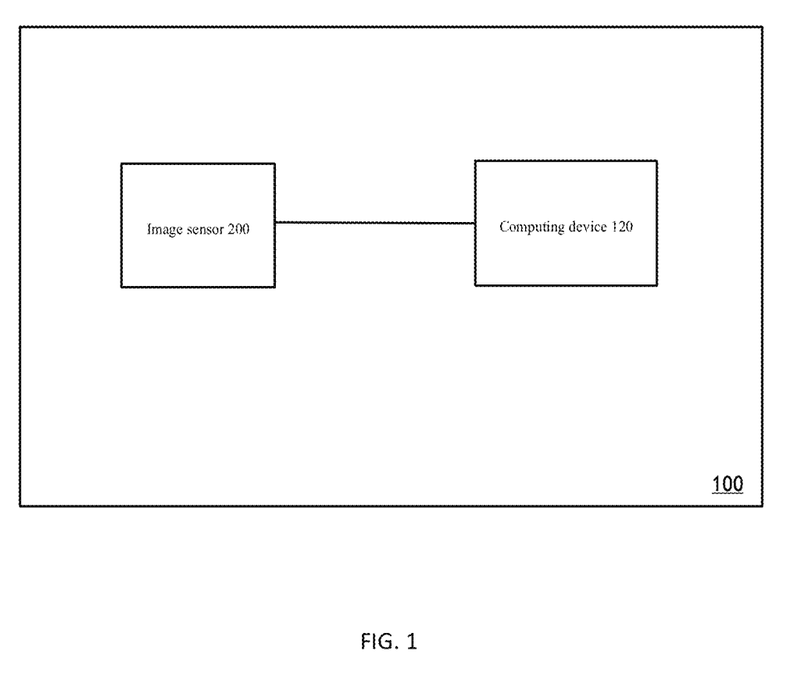
FIG. 1 shows a schematic diagram of an image processing system 100 according to some examples of the present disclosure.

FIG. 1 shows a schematic diagram of an image processing system 100 according to some examples of the present disclosure.

As shown in FIG. 1, the image processing system 100 includes an image sensor 200 and a computing device 120 that are coupled to each other. The image sensor 200 is capable of detecting discontinuity of movement in a time-space domain. For instance, the computing device 120 may be implemented as an image processing device.

The image sensor 200 is internally provided with a pixel unit array composed of a plurality of pixel units. Each pixel unit may be triggered only when sensing a light intensity change (that is, a movement change in a field of view), respond to and record an area where a light intensity changes rapidly, and generate light intensity change information (such as a time stamp and a light intensity threshold of the light intensity change) and a coordinate position of the triggered pixel unit as event data of a triggering event. The image sensor 200 transmits the event data to the computing device 120. The computing device 120 processes the event data, so as to facilitate next computation and application.

The computing device 120 may be implemented as a server or a server cluster, or as a personal computer including a desktop computer configuration and a notebook computer configuration. Certainly, the computing device 200 may further be implemented as part of a small-sized portable (or mobile) electronic device, or even a micro computing module. The example of the present disclosure has no specific limit on the computing device.

According to the embodiment of the present disclosure, working modes of the image processing system 100 include a low-power mode and a normal working mode.

In the low-power mode, the image sensor 200 no longer outputs the event data to the external computing device 120, but only monitors dynamic information in the field of view with low power consumption, which is independent of output of the event data and computation of a back-end algorithm. The computing device 120 may be in a completely dormant state because the computing device does not need to receive and process any event data.

When effective movement occurs in the field of view, the number of triggered pixel units gradually increases. The image sensor 200 monitors the change and enters the normal working mode when a certain conditions are satisfied. In this case, the image sensor 200 outputs the event data of the triggered pixel unit to the computing device 120. In the normal working mode, the image sensor 200 has the same working principle and working process as a general dynamic vision sensor, which will not be repeated herein.

Different from the way to reduce overall power consumption of the system according to the back-end algorithm, the image processing system 100 mainly relies on the front-end image sensor 200 to identify the case having less dynamic information in the field of view and thus start the low-power mode, such that the overall power consumption of the system is reduced. Meanwhile, in the low-power mode, the image sensor 200 monitors the dynamic information in the field of view by itself with very low power consumption, which is independent of output of the event data and computation of the back-end computing device 120. Therefore, a data reading circuit and the computing device 120 may be turned off, such that power consumption of the system 100 is further reduced.

Figure 2:
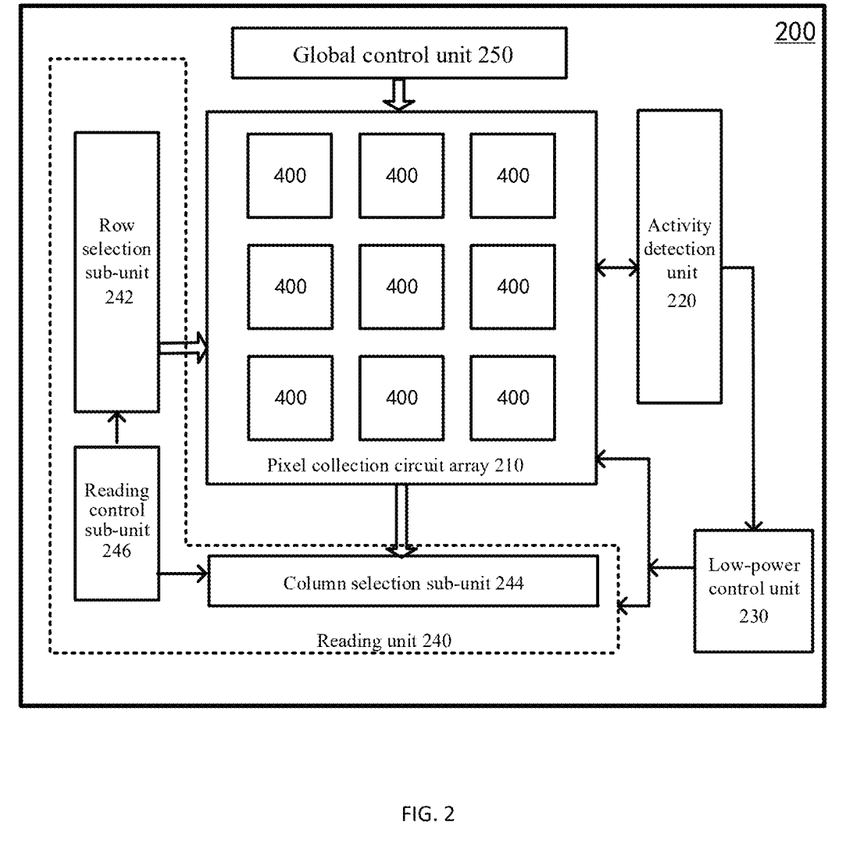
FIG. 2 shows a schematic diagram of an image sensor 200 according to some examples of the present disclosure.

FIG. 2 shows a schematic diagram of an image sensor 200 according to some examples of the present disclosure.

As shown in FIG. 2, the image sensor 200 at least includes: a pixel collection circuit array 210, an activity detection unit 220, a low-power control unit 230, a reading unit 240, and a global control unit 250.

As a core part of the image sensor 200, the pixel collection circuit array 210 is composed of a plurality of pixel collection circuits 400 (or pixel units) evenly distributed in row and column directions (FIG. 2 shows a 3×3 pixel collection circuit array, which does not limit the pixel collection circuit array). The pixel collection circuit array 210 is coupled to the activity detection unit 220, the low-power control unit 230, the reading unit 240, and the global control unit 250 separately. More specifically, in an example, the pixel collection circuit array 210 is coupled to the activity detection unit 220 via a global activity detection signal line and coupled to the global control unit 250 via a global reset signal line. Meanwhile, the pixel collection circuit array 210 and the reading unit 240 are coupled to the low-power control unit 230 separately via a global low-power enable signal line. Moreover, the pixel collection circuit array 210 is further coupled to the reading unit 240 via a row request line, a row selection line, a column request line, and a column selection line.

According to the embodiment of the present disclosure, the pixel collection circuits monitor a light intensity change in a field of view in real time and enter a trigger state when the light intensity change satisfies a certain conditions.

The global control unit 250 is responsible for resetting the entire pixel collection circuit array 210 when the image sensor 200 is powered on, such that each pixel collection circuit is ensured to have a stable initial state. Moreover, when the pixel collection circuit array 210 remains in a stable initial state, reset releasing is conducted, such that the pixel collection circuit array 210 starts to work.

The reading unit 240 includes a row selection sub-unit 242, a column selection sub-unit 244, and a reading control sub-unit 246. The row selection sub-unit 242 manages the pixel collection circuit array 210 in a row direction. The column selection sub-unit 244 manages the pixel collection circuit array 210 in a column direction. The reading control sub-unit 246 coordinates the row selection sub-unit 242 and the column selection sub-unit 244 to complete operations such as line feed. The row selection sub-unit 242 and the column selection sub-unit 244 may be random scanning deciders or sequential scanning selective scanning circuits, which will not be repeated herein.

Compared with a general dynamic vision sensor, the image sensor 200 adds the activity detection unit 220 and the low-power control unit 230. The activity detection unit 220 monitors a current value on the global activity detection signal line. According to the example of the present disclosure, a total value of currents flowing through the global activity detection signal line is proportional to the number of pixel units in the pixel collection circuit array 210 in the trigger state. That is, the more pixel units are triggered, the greater the current value on the global activity detection signal line, and the less pixel units are triggered, the smaller the current value on the global activity detection signal line. When the current value is smaller than an activity threshold, the activity detection unit 220 sets a low-activity enable signal to be valid, which indicates that no effective movement occurs in the field of view in this case.

The low-power control unit 150 receives the low-activity enable signal output from the activity detection unit 140, sets the global low-power enable signal to be valid when the low-activity enable signal is valid, and outputs the global low-power enable signal to the pixel collection circuit array 210 and the reading unit 240. In this case, the entire image sensor 200 enters the low-power mode.

In the low-power mode, the pixel collection circuit enters a self-timing working mode, and its internal self-timing reset logic is activated. Meanwhile, the pixel collection circuit may still detect a light intensity change in an external field of view and enter the trigger state. After entering the trigger state, the pixel collection circuit may remain in the trigger state for a period of time, and then cancel the trigger state by itself and restart to detect an external light intensity change.

According to an example of the present disclosure, in the self-timing working mode, an analog module in the pixel collection circuit further works in a low-bias current state, such that static power consumption of the pixel collection circuit array 210 is reduced.

Meanwhile, the reading unit 240 is reset when the global low-power enable signal is valid. The row selection sub-unit 242, the column selection sub-unit 244 and the reading control sub-unit 246 all stop working. In this case, the reading unit 240 does not consume any dynamic power consumption, and a back-end computing device 120 may further enter a dormant state. In this way, power consumption of the image sensor 200 and the image processing system 100 is greatly reduced.

In another aspect, in the low-power mode, the activity detection unit 220 may further monitor a value of a current flowing through the global activity detection signal line in real time. When effective movement occurs in the field of view, the number of triggered pixel units gradually increases, and the total value of the currents flowing through the global activity detection signal line increases. When the current value is not smaller than the activity threshold, the activity detection unit 220 sets the low-activity enable signal to be invalid, and accordingly, the low-power control unit 230 sets the low-power enable signal to be invalid, such that the system quits the low-power mode and enters the normal working mode. In this case, the pixel collection circuit further quits the self-timing working mode, and the reading unit 240 is further released from a reset state.

In the normal working mode, the reading unit 240 manages the pixel collection circuit array 210, and outputs event data of the triggered pixel collection circuit. In the normal working mode, the image sensor 200 according to the present disclosure has the same working principle and working process as a general dynamic vision sensor, which will not be repeated herein.

To further describe a workflow of the image sensor 200, FIGS. 3A-3D illustrate the workflow of the image sensor 200 according to an example of the present disclosure with an instance. FIG. 3E shows a current value on a global activity detection signal line and a specific state of a low-activity enable signal in the instance. It should be noted that the description of signal values of a current signal and a low-activity enable signal in FIG. 3E are only illustrative, so as to facilitate description of change states of the two signals in the entire process, which does not limit a magnitude of the signal values.

Figure 3A:
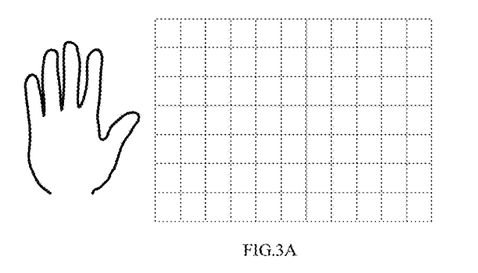

As shown in FIGS. 3A-3D, a hand sweeps across a field of view of the image sensor from left to right. At an initial moment, as shown in FIG. 3A, the hand is located outside the field of view. In this case, no movement occurs in the field of view, and little dynamic information exists in the field of view. A total value of a current on a global activity detection signal line is also very small, which is smaller than an activity threshold (as shown by a dotted line in FIG. 3E). Therefore, a low-activity enable signal is effective, and the image sensor 200 works in a low-power mode and no event data is output. The image sensor 200 monitors the dynamic information in the field of view by itself with very low power consumption.

Figure 3B:
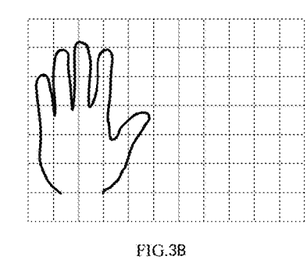

In FIG. 3B, the hand starts to move to the field of view of the image sensor 200. In this case, the number of triggered pixel collection circuits gradually increases, and the value of the current flowing through the global activity detection signal line gradually increases. When the current value is not smaller than the activity threshold, as shown in point A in FIG. 3E, an activity detection unit 220 sets the low-activity enable signal to be invalid, and accordingly, a low-power control unit 230 sets the low-power enable signal to be invalid, such that the image sensor 200 quits the low-power mode and enters the normal working mode. In the normal working mode, movement of the hand is detected, and corresponding event data is output to the external computing device 120.

Figure 3C:
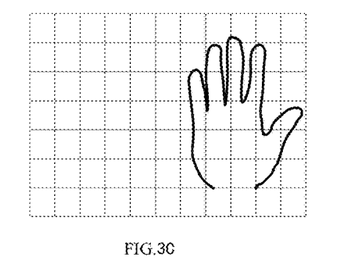

As shown in FIGS. 3B-3C, the moving hand is generally located in the field of view of the image sensor, so the current value on the global activity detection signal line is generally smaller than the activity threshold, the image sensor 200 is generally in the normal working mode, and the movement of the hand is generally detected and the corresponding event data is output.

Figure 3D:
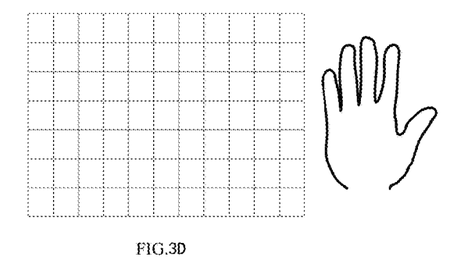
Figure 3E:
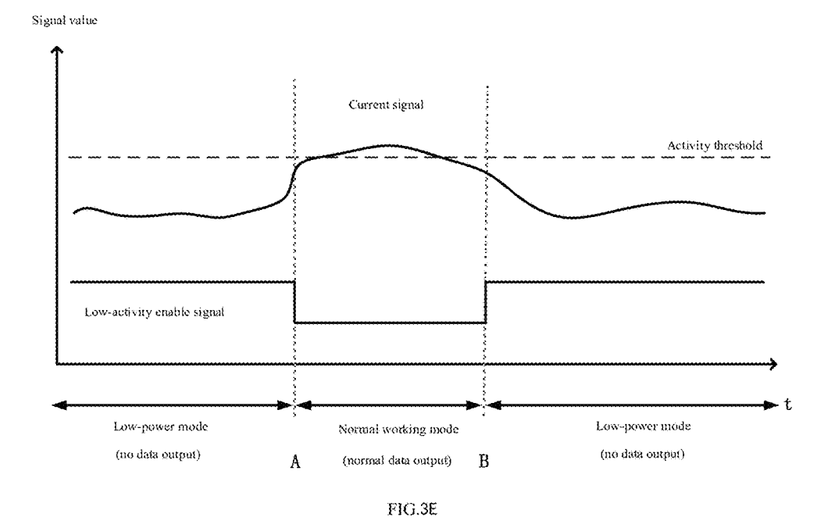
FIG. 3E shows a current value on a global activity detection signal line and a specific state of a low-activity enable signal in the instance.

In FIG. 3D, when the hand moves out of the field of view, the current value on the global activity detection signal line gradually decreases due to decrease in the number of triggered pixel units. When the current value is smaller than the activity threshold, as shown in point B in FIG. 3E, the activity detection unit 220 sets the low-activity signal to be valid again, and the image sensor 200 enters the low-power mode again.

Figure 4A:
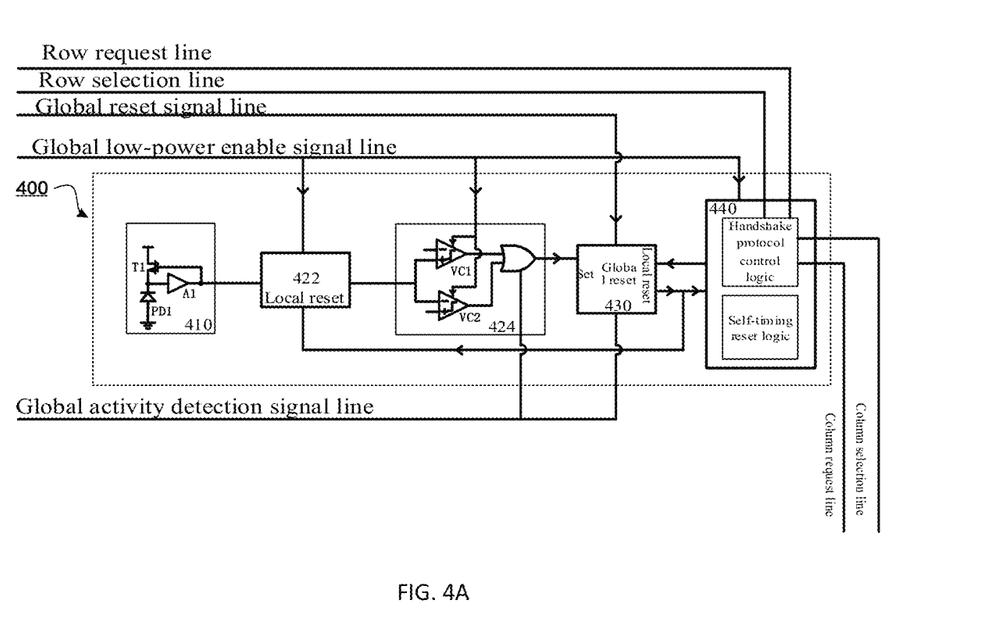
FIGS. 4A and 4B show a schematic diagram of a pixel collection circuit 400 according to an example of the present disclosure.
Figure 4B:
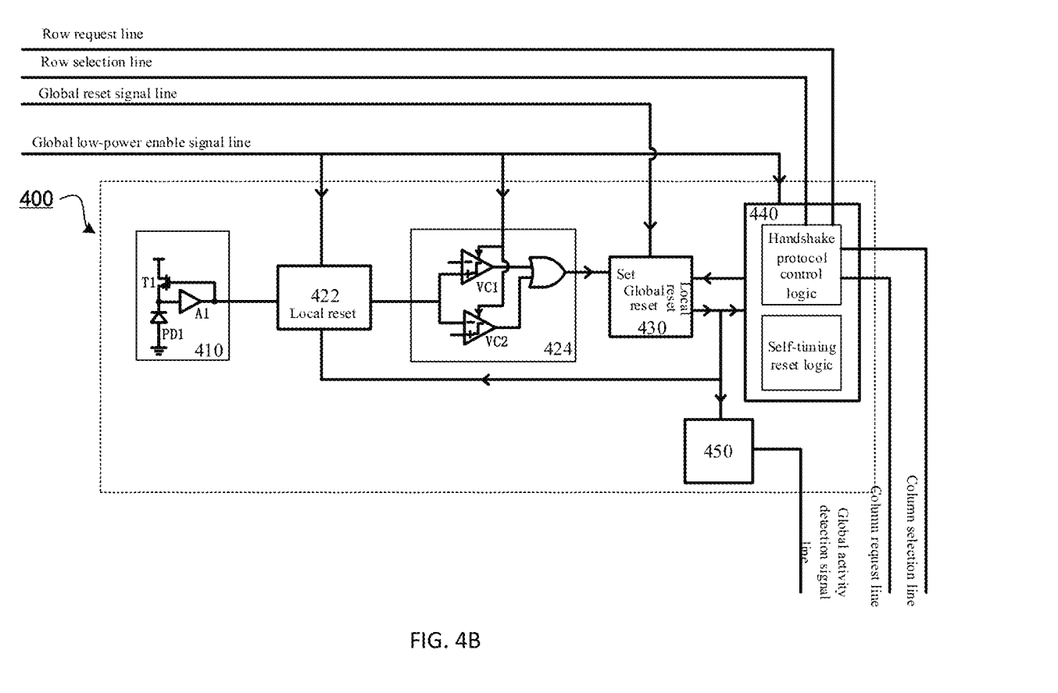

FIGS. 4A and 4B show a schematic diagram of a pixel collection circuit 400 according to an example of the present disclosure.

In the example shown in FIG. 4A, a pixel collection circuit 400 includes: a photoelectric detection module 410, a trigger generation module 420, a latch 430, and a logic module 440. The trigger generation module 420 further includes: a filter amplifier 422 and a threshold comparison sub-module 424. The logic module 440 includes a handshake protocol control logic and a self-timing reset logic.

More specifically, the latch 430 is coupled to a global control unit 250 through a global reset signal line. The logic module 440 is coupled to a reading unit 240 through a row request line, a row selection line, a column request line and a column selection line. The filter amplifier 422, the threshold comparison sub-module 424, the latch 430 and the logic module 440 are coupled to a low-power control unit 230 separately through a global low-power enable signal line. The threshold comparison sub-module 424 and the latch 430 are coupled to an activity detection unit 220 separately through a global activity detection signal line.

According to an example, the photoelectric detection module 410 monitors an optical signal emitted to the photoelectric detection module in real time and outputs a corresponding electrical signal.

The trigger generation module 420 generates a trigger signal when the electrical signal satisfies a threshold condition. More specifically, the filter amplifier 422 firstly filters and/or amplifies the electrical signal output from the photoelectric detection module 410, so as to generate a processed electrical signal. Then, the threshold comparison sub-module 424 determines whether the processed electrical signal satisfies the threshold condition, and generates the trigger signal when the processed electrical signal satisfies the threshold condition. In an example, the filter amplifier 422 is a high-pass filter amplifier. The threshold comparison sub-module 424 includes a first comparator (VC1), a second comparator (VC2), and an OR gate.

The latch 430 is coupled to the threshold comparison sub-module 424 and is set when the trigger signal is received (that is, the processed electrical signal satisfies the threshold condition).

The logic module 440 is coupled to the latch 430, and includes a working logic of the pixel collection circuit 400. For instance, the handshake protocol control logic is responsible for communication between the pixel collection circuit 400 and peripheral circuits. The self-timing reset logic is activated when the pixel collection circuit 400 enters a self-timing working mode (that is, when the image sensor 200 enters a low-power mode) and the pixel collection circuit 400 is triggered. In this case, the pixel collection circuit 400 may automatically remain in a trigger state for a period of time (that is, "self-timing"). Then, the latch 430 is reset, such that the pixel collection circuit 400 may be automatically released from the trigger state, and an external light intensity change is monitored again.

In addition, the global activity detection signal line is arranged as a power line or a ground line of the OR gate of the threshold comparison sub-module 424 and a power line or a ground line of the latch 430, such that dynamic currents on the two modules are monitored. In this way, activity information of the field of view may be determined by detecting the value of the current flowing through the global activity detection signal line.

The pixel collection circuit 400 of the example is mainly different from a pixel collection circuit of a general dynamic vision sensor in that first, the self-timing reset logic is added to the logic module; and second, the global activity detection signal line is introduced into the OR gate in the threshold comparison sub-module 424 and the latch 430. When the pixel collection circuit 400 is triggered, output of the first comparator VC1 or the second comparator VC2 changes to a high level, and output of the OR gate further changes to a high level and the latch is set. Therefore, when the pixel collection circuit is triggered, input and output of digital circuit modules such as the OR gate and the latch are overturned, such that a certain dynamic currents may be consumed. Conversely, when the pixel collection circuit is not triggered, the digital modules cannot consume currents.

Compared with FIG. 4A, in the example shown in FIG. 4B, the pixel collection circuit 400 includes a gated current source 450 in addition to the photoelectric detection module 410, the filter amplifier 422, the threshold comparison sub-module 424, the latch 430, and the logic module 440. The gated current source 450 is coupled to the latch 430, the logic module 440 and the filter amplifier 422 separately. Meanwhile, the global activity detection signal line is connected to the gated current source 450, and connection ways of other signal lines are as shown in FIG. 4A.

In an example, the gated current source 450 includes a current source and a switch controlled by an output signal of the latch 430. When the pixel collection circuit 400 is triggered, the latch 430 is set, the switch in the gated current source 450 is switched on, and a current of the current source flows through the global activity detection signal line. When the pixel collection circuit 400 is not triggered, the latch 430 is reset, the switch in the gated current source 450 is switched off, and a current of the current source does not flow through the global activity detection signal line. In this way, the total current value on the global activity detection signal line may further represent the activity information of the field of view.

Figure 5A:
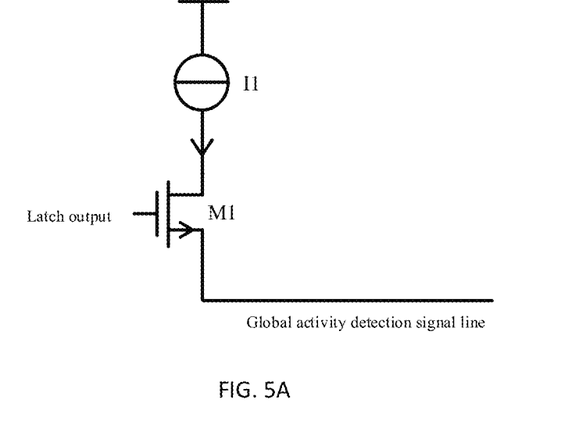
FIGS. 5A and 5B show a schematic diagram of a gated current source 450 according to an example of the present disclosure.
Figure 5B:
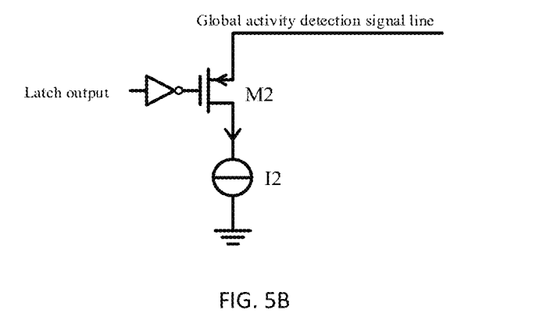

FIGS. 5A and 5B show a schematic diagram of a gated current source 450 according to an example of the present disclosure.

In FIG. 5A, the gated current source 450 includes a first current source 11 and a first transistor M1. A gate electrode of M1 is connected to output of a latch 430, and a source electrode of M1 is connected to a global activity detection signal line. In this case, the global activity detection signal line has to remain at a low level, such that it is ensured that M1 may be turned on when the output of the latch 430 is at a high level. When a pixel collection circuit 400 is triggered, the latch 430 is set, the output changes to the high level, the first transistor M1 is turned on, and a current of the first current source 11 flows into the global activity detection signal line. When the pixel collection circuit 400 is not triggered, the latch 430 remains in a reset state, the output is at a low level, the first transistor M1 is turned off, and the current of the first current source 11 does not flow through the global activity detection signal line.

In the example shown in FIG. 5B, the gated current source 450 includes a second current source 12, a second transistor M2, and a first phase inverter. As shown in FIG. 5B, M2 is a P-type transistor. The first phase inverter has one end connected to an output end of the latch 430 and the other end connected to a gate electrode of the second transistor M2. That is, the output of the latch 430 is connected to the gate electrode of the second transistor M2 via the first phase inverter, and a source electrode of M2 is connected to the global activity detection signal line. The second current source 12 has one end connected to a drain electrode of M2 and the other end grounded. In this case, the global activity detection signal line has to remain at a high level, such that it is ensured that M2 may be turned on when the output of the latch 430 is at a high level. When the pixel collection circuit 400 is triggered, the latch 430 is set, the output changes to the high level, the second transistor M2 is turned on, and a current of the second current source 12 flows out from the global activity detection signal line. When the pixel collection circuit 400 is not triggered, the latch 430 remains in the reset state, the output is at a low level, the second transistor M2 is turned off, and the current of the second current source 12 does not flow through the global activity detection signal line.

Figure 6:
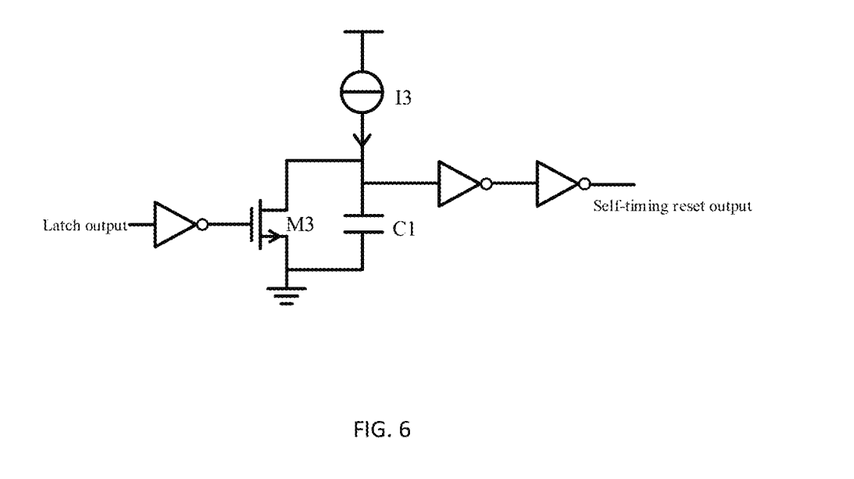
FIG. 6 shows a schematic diagram of a self-timing reset logic in a pixel collection circuit 400 according to an example of the present disclosure.

FIG. 6 shows a schematic diagram of a self-timing reset logic in a pixel collection circuit 400 according to an example of the present disclosure.

As shown in FIG. 6, the self-timing reset logic includes: a third transistor M3, a third current source 13, a first capacitor C1, and three phase inverters (a second phase inverter, a third phase inverter, and a fourth phase inverter). The second phase inverter has one end connected to an output end of a latch 430 and the other end connected to a gate electrode of the third transistor. A source electrode of the third transistor and a lower pole plate of the first capacitor are both grounded, and a drain electrode of the third transistor and an upper pole plate of the first capacitor are both connected to the third current source. The third current source has the other end connected to a power supply. The third phase inverter and the fourth phase inverter are connected in sequence. The other end of the third phase inverter is connected to the upper pole plate of the first capacitor. The other end of the fourth phase inverter outputs a self-timing reset output signal. When the self-timing reset output signal is valid, the latch 430 is reset.

When the pixel collection circuit 400 is not triggered, output of the latch 430 is at a low level, the gate electrode of the third transistor M3 is at a high level, M3 is turned on, the upper pole plate of C1 is pulled to a low level, and self-timing reset output is invalid. When the pixel collection circuit 400 is triggered, the output of the latch 430 is at a high level, the gate electrode of M3 changes to a low level, M3 is turned off, the third current source 13 starts to charge the first capacitor C1, and a potential of the upper pole plate of C1 slowly increases. When the potential increases to a turnover level of the third phase inverter, a self-timing reset signal output from the self-timing reset logic is valid, such that the latch is reset. In addition, timing time of the self-timing reset logic is determined by the third current source 13. The smaller 13 is, the slower a charging speed of the first capacitor C1 is, and the longer the timing time is.

In conclusion, the pixel collection circuit 400 has two working modes: a self-timing working mode and a normal working mode, which are controlled by a global low-power enable signal output from a low-power control unit 230. When less dynamic information exists in a field of view, the global low-power enable signal is valid, the image sensor 200 enters a low-power mode, and the pixel collection circuit 400 enters the self-timing mode. On one hand, part of an analog circuit in the pixel collection circuit 400 enters a low-bias current mode, such that static power consumption of a pixel unit is reduced. The part of circuit mainly refers to a filter amplifier 422 and a first comparator VC1 and a second comparator VC2 in a threshold comparison submodule 424. In addition, the global low-power enable signal line is further coupled to a logic module 440. In the self-timing mode, a handshake protocol control logic is turned off, and a self-timing reset logic is turned on. When the pixel collection circuit is triggered, the self-timing reset logic is activated, and provides a self-timing reset output signal for the latch 430 after timing is over, such that a set state of the latch 430 is cancelled. In the self-timing working mode, the self-timing reset logic replaces the handshake protocol control logic, so as to complete a reset function of the latch 430. In this way, the pixel collection circuit 400 may work completely autonomously without relying on a peripheral reading unit 240 (in the low-power mode, the reading unit 240 is reset to reduce dynamic power consumption of the system). When more dynamic information exists in the field of view, the global low-power enable signal is invalid, the image sensor 200 enters the normal working mode, and the pixel collection circuit 400 enters the normal working mode. On one hand, part of the analog circuit in the pixel collection circuit 400 enters a normal-bias current mode, such that a response speed of the pixel collection circuit to external light intensity changes is improved. On the other hand, the handshake protocol control logic is turned on, the self-timing reset logic is turned off, and the peripheral reading unit 240 manages a pixel collection circuit array, which processes and reads event data of the pixel collection circuit in a trigger state to a computing device 120. In the normal working mode, the pixel collection circuit and the image sensor provided herein have the same working principle as a general dynamic vision sensor, which will not be repeated herein.

FIGS. 7A-7D show a schematic diagram of an activity detection unit 220 according to some examples of the present disclosure. The activity detection unit 220 monitors a current value on a global activity detection signal line in real time, and sets a low-activity enable signal to be valid when the current value is smaller than an activity threshold.

Figure 7A:
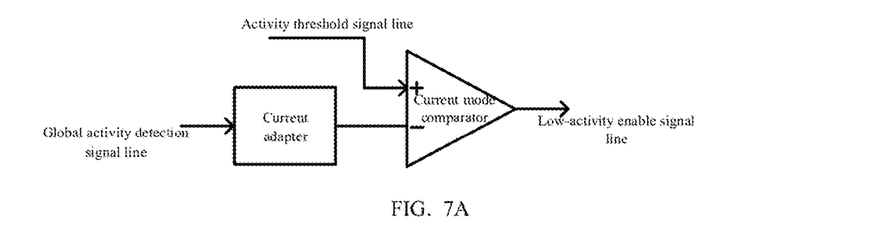
FIGS. 7A-7D show a schematic diagram of an activity detection unit 220 according to some examples of the present disclosure.

In FIG. 7A, the activity detection unit 220 is composed of a current adapter and a current mode comparator. The current adapter has one end connected to the global activity detection signal line and the other end connected to the current mode comparator. The current adapter clamps the global activity detection signal line at a fixed level. Meanwhile, a current signal on the global activity detection signal line is copied for use of the current mode comparator. The current mode comparator has a positive input end connected with an activity threshold signal and a negative input end connected with a current signal of the current adapter, completes comparison of the two signals in a current domain, and sets the low-activity enable signal to be valid when the current signal is smaller than the activity threshold signal.

Figure 7B:
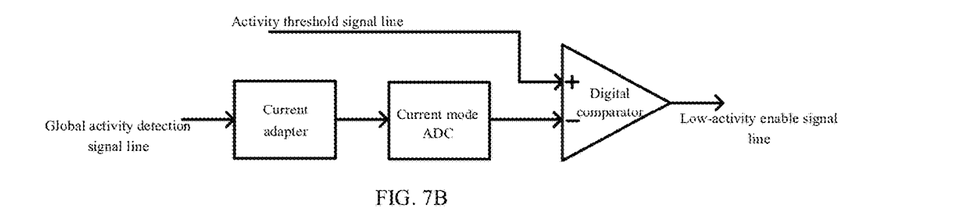

In FIG. 7B, the activity detection unit 220 is composed of a current adapter, a current mode analog-digital converter (current mode ADC), and a digital comparator. The current adapter has one end connected to the global activity detection signal line and the other end connected to the current mode analog-digital converter. In the example, the current signal output from the current adapter is converted into a digital signal through the current mode ADC. The digital comparator has a positive input end connected with the activity threshold signal (where the activity threshold signal is a digital signal), and a negative input end connected with a digital signal output from the current mode ADC. The digital comparator completes comparison of the two signals in a digital domain, and sets the low-activity enable signal to be valid when the current signal is smaller than the activity threshold signal.

Figure 7C:
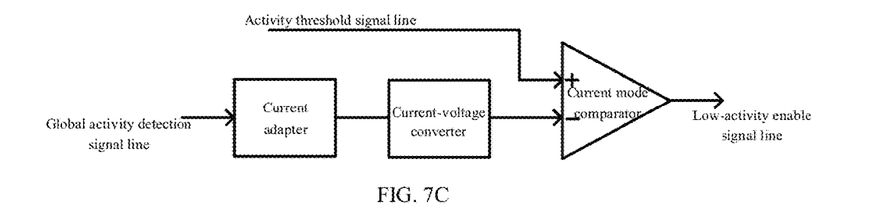

In FIG. 7C, the activity detection unit 220 is composed of a current adapter, a current-voltage converter, and a voltage mode comparator. The current adapter has one end connected to the global activity detection signal line and the other end connected to the current-voltage converter. In the example, the current signal output from the current adapter is converted into a voltage signal through the current-voltage converter. The voltage mode comparator has a positive input end connected with the activity threshold signal and a negative input end connected with the voltage signal. The voltage mode comparator completes comparison of the two signals in a voltage domain, and sets the low-activity enable signal to be valid when the voltage signal is smaller than the activity threshold signal.

Figure 7D:
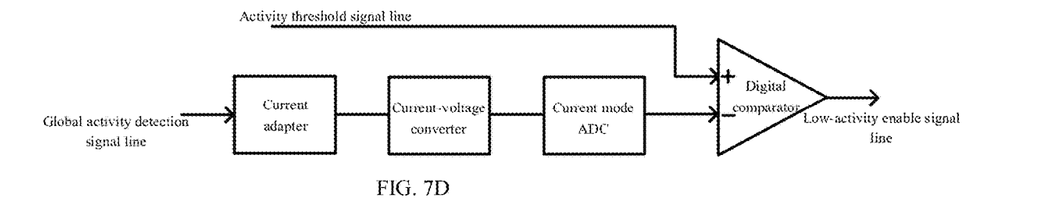

In FIG. 7D, the activity detection unit 220 is composed of a current adapter, a current-voltage converter, a voltage mode analog-digital converter (voltage mode ADC), and a digital comparator. The current adapter has one end connected to the global activity detection signal line and the other end connected to the current-voltage converter. In the example, the current signal output from the current adapter is converted into the voltage signal through the current-voltage converter, and then converted into a digital signal through quantification of the voltage mode ADC. The digital comparator has a positive input end connected with the activity threshold signal and a negative input end connected with the digital signal. The digital comparator completes comparison of the two signals in the digital domain, and sets the low-activity enable signal to be valid when the digital signal is smaller than the activity threshold signal.

To sum up, the image sensor according to the present disclosure is capable of independently identifying the case having less dynamic information in the field of view without relying on the back-end algorithm, and reduces the overall power consumption of itself and the entire image processing system. Specifically, firstly, the global activity detection signal line is added to the pixel collection circuit array, and values of currents flowing through the global activity detection signal line are different before and after the pixel collection circuit is triggered. Secondly, outside the pixel collection circuit array, the activity detection unit measures the current value on the global activity detection signal line and determine the amount of dynamic information in the field of view according to the current value, that is, activity information of the field of view. When the field of view is low in activity and less in dynamic information in the field of view, the low-power control unit enables the image sensor to enter the low-power mode, and the image sensor monitors the dynamic information in the field of view by itself with low power consumption. This monitoring does not depend on output of the event data and computation of the back-end algorithm, such that power consumption may reduced by turning off the reading unit. Meanwhile, in the low-power mode, the back-end computing device does not need to receive the event data, so the computing device may be turned off to further reduce the power consumption of the image processing system.

In the description provided herein, numerous specific details are set forth. However, it can be understood that the examples of the present disclosure may be implemented without these specific details. In some instances, well-known methods, structures and technologies are not shown in detail, such that understanding of the description is not obscured.

Similarly, it should be understood that in the above description of the illustrative examples of the present disclosure, various features of the present disclosure are sometimes grouped together into a single example, figure, or description thereof, in order to simplify the present disclosure and facilitate understanding of one or more aspects of the present disclosure. However, the disclosed method should not be interpreted as reflecting the following intention that the claimed invention requires more features than those explicitly recited in each claim. More specifically, as reflected in the following claims, the aspect of the present disclosure has less features than all features of the single example disclosed above. Therefore, the claims following a specific embodiment are hereby expressly incorporated into the specific embodiment, where each claim serves as a separate example of the present disclosure.

Those skilled in the art should understand that modules or units or assemblies of devices in the examples disclosed herein may be arranged in the devices as described in the example, and alternatively may be located in one or more devices different from the devices in the example. The modules in the above-mentioned examples may be combined into a module, or in addition may be divided into a plurality of sub-modules.

Those skilled in the art may understand that the modules in the device in the example may be adaptively changed and arranged in one or more devices different from the example. The modules or units or assemblies in the example may be combined into one module or unit or assembly, and in addition, may be divided into a plurality of sub-modules or sub-units or sub-assemblies. Except that at least part of such features and/or processes or units are mutually exclusive, all features disclosed in the description (including appended claims, abstract and drawings) and all processes or units of any method or device so disclosed may be combined in any combination. Unless explicitly stated otherwise, each feature disclosed in the description (including the appended claims, abstract and drawings) may be replaced with alternative features that serve the same, equivalent or similar objectives.

In addition, those skilled in the art can understand that although some examples described herein include some features but not other features included in the other examples, combinations of the features of different examples mean being within the scope of the present disclosure and forms different examples. For instance, in the following claims, any one of the claimed examples may be used in any combination.

In addition, some examples are described herein as methods or combinations of method elements that may be implemented by a processor of a computer system or by other apparatuses executing the described functions. Accordingly, a processor having a necessary instruction configured to implement the method or method element forms an apparatus configured to implement the method or method element. In addition, the elements described herein of the apparatus example are instances of the apparatus configured to implement the functions executed by the elements for the objective of implementing the present disclosure.

As used herein, unless otherwise specified, ordinal numerals such as "first", "second" and "third" are used to describe a common object so as to only indicate different instances involving similar objects, without intention to imply that the objects thus described have to have a given order in terms of time, space, ordering or in any other way.

Although the present disclosure is described in terms of a limited number of examples, those skilled in the art may understand that other examples may be envisaged within the scope of the present disclosure thus described, having the benefit of the above description. In addition, it should be noted that the language used in the description is mainly selected for readability and teaching objectives, instead of explaining or defining the subject matter of the present disclosure. Therefore, without departing from the scope and spirit of the appended claims, many modifications and changes will be obvious to those of ordinary skill in the art. The disclosure of the present disclosure is illustrative rather than restrictive with respect to its scope, and the scope of the present disclosure is defined by the appended claims.

What is claimed is:

1. An image sensor, comprising:
   a pixel collection circuit array composed of a plurality of pixel collection circuits, wherein the pixel collection circuits are suitable for monitoring a light intensity change in a field of view and entering a trigger state when the light intensity change satisfies a certain conditions;
   an activity detection unit coupled to the pixel collection circuit array via a global activity detection signal line, and suitable for monitoring a current value on the global activity detection signal line and setting a low-activity enable signal to be valid when the current value is smaller than an activity threshold, wherein the current value is positively correlated to the number of the pixel collection circuits in the trigger state in the pixel collection circuit array;
   a low-power control unit having one end coupled to the pixel collection circuit array and a reading unit via a global low-power enable signal line and the other end coupled to the activity detection unit, and suitable for setting the global low-power enable signal to be valid when the low-activity enable signal is valid; and
   the reading unit coupled to the pixel collection circuit array and the low-power control unit separately and suitable for being reset when the global low-power enable signal is valid.

2. The image sensor according to claim 1, further comprising:
   a global control unit coupled to the pixel collection circuit array via a global reset signal line, and suitable for resetting the pixel collection circuit array when the image sensor is powered on, and conducting reset releasing when the pixel collection circuit array remains in a stable initial state, such that the pixel collection circuit array starts to work.

3. The image sensor according to claim 1, wherein the pixel collection circuit comprises:
   a photoelectric detection module suitable for monitoring an optical signal emitted to the photoelectric detection module in real time and outputting a corresponding electrical signal;
   a trigger generation module suitable for generating a trigger signal when the electrical signal satisfies a threshold condition;
   a latch suitable for being set when the trigger signal is received; and
   a logic module comprising a handshake protocol control logic and a self-timing reset logic, wherein the self-timing reset logic is activated when the pixel collection circuit enters a self-timing working mode, wherein
   the latch is further suitable for being reset after the pixel collection circuit remains in the trigger state for a period of time in the self-timing working mode.

4. The image sensor according to claim 3, wherein in the pixel collection circuit, the trigger generation module comprises:
   a filter amplifier suitable for filtering and/or amplifying the electrical signal and generating a processed electrical signal; and
   a threshold comparison sub-module suitable for generating the trigger signal when the processed electrical signal satisfies the threshold condition, wherein the threshold comparison sub-module comprises a first comparator, a second comparator, and an OR gate.

5. The image sensor according to claim 4, wherein
   the global activity detection signal line is a power line or a ground line of the OR gate and a power line or a ground line of the latch, so as to monitor dynamic currents on the OR gate and the latch.

6. The image sensor according to claim 4, wherein the pixel collection circuit further comprises:
   a gated current source comprising a current source and a switch controlled by an output signal of the latch, wherein
   when the latch is set, the switch in the gated current source is switched on, and a current of the current source flows through the global activity detection signal line; and
   when the latch is reset, the switch in the gated current source is switched off, and a current of the current source does not flow through the global activity detection signal line.

7. The image sensor according to claim 6, wherein in the pixel collection circuit, the gated current source comprises:
   a first current source having one end connected to a drain electrode of a first transistor and the other end connected to a power supply; and
   the first transistor having a gate electrode connected to an output end of the latch and a source electrode connected to the global activity detection signal line.

8. The image sensor according to claim 6, wherein in the pixel collection circuit, the gated current source comprises:
   a first phase inverter having one end connected to an output end of the latch and the other end connected to a gate electrode of a second transistor;
   the second transistor having a source electrode connected to the global activity detection signal line; and
   a second current source having one end connected to a drain electrode of the second transistor and the other end grounded.

9. The image sensor according to claim 3, wherein in the pixel collection circuit, the self-timing reset logic comprises:
- a second phase inverter having one end connected to an output end of the latch and the other end connected to a gate electrode of a third transistor;
- the third transistor and a first capacitor, wherein a source electrode of the third transistor and a lower pole plate of the first capacitor are both grounded, and a drain electrode of the third transistor and an upper pole plate of the first capacitor are both connected to a third current source;
- the third current source having the other end connected to a power supply; and
- a third phase inverter and a fourth phase inverter connected in sequence, wherein the other end of the third phase inverter is connected to the upper pole plate of the first capacitor, and the other end of the fourth phase inverter outputs a self-timing reset output signal.

10. The image sensor according to claim 3, wherein
the activity detection unit is further suitable for setting the output low-activity enable signal to be invalid when the current value is not smaller than the activity threshold;
the low-power control unit is further suitable for setting the global low-power enable signal to be invalid when the low-activity enable signal is invalid;
the pixel collection circuit array is further suitable for quitting the self-timing working mode when the global low-power enable signal is invalid; and
the reading unit is further suitable for conducting reset state releasing when the global low-power enable signal is invalid, so as to respond to the pixel collection circuit in the trigger state, and outputting event data of the triggered pixel collection circuit.

11. The image sensor according to claim 1, wherein the activity detection unit comprises:
- a current adapter having one end connected to the global activity detection signal line and the other end connected to a current mode comparator, and suitable for clamping the global activity detection signal line at a fixed level and copying a current signal on the global activity detection signal line and outputting the current signal to the current mode comparator; and
- the current mode comparator having a positive input end connected with an activity threshold signal and a negative input end connected with the current signal, and suitable for setting the low-activity enable signal to be valid when the current signal is smaller than the activity threshold signal.

12. The image sensor according to claim 1, wherein the activity detection unit comprises:
- a current adapter having one end connected to the global activity detection signal line and the other end connected to a current mode analog-digital converter, and suitable for clamping the global activity detection signal line at a fixed level and copying a current signal on the global activity detection signal line and outputting the current signal to the current mode analog-digital converter;
- the current mode analog-digital converter suitable for converting the current signal into a digital signal; and
- a digital comparator having a positive input end connected with an activity threshold signal and a negative input end connected with the digital signal, and suitable for setting the low-activity enable signal to be valid when the digital signal is smaller than the activity threshold signal.

13. The image sensor according to claim 1, wherein the activity detection unit comprises:
- a current adapter having one end connected to the global activity detection signal line and the other end connected to a current-voltage converter, and suitable for clamping the global activity detection signal line at a fixed level and copying a current signal on the global activity detection signal line and outputting the current signal to the current-voltage converter;
- the current-voltage converter suitable for converting the current signal into a voltage signal; and
- a voltage mode comparator having a positive input end connected with an activity threshold signal and a negative input end connected with the voltage signal, and suitable for setting the low-activity enable signal to be valid when the voltage signal is smaller than the activity threshold signal.

14. The image sensor according to claim 1, wherein the activity detection unit comprises:
- a current adapter having one end connected to the global activity detection signal line and the other end connected to a current-voltage converter, and suitable for clamping the global activity detection signal line at a fixed level and copying a current signal on the global activity detection signal line and outputting the current signal to the current-voltage converter;
- the current-voltage converter suitable for converting the current signal into a voltage signal;
- a voltage mode analog-digital converter suitable for converting the voltage signal into a digital signal; and
- a digital comparator having a positive input end connected with an activity threshold signal and a negative input end connected with the digital signal, and suitable for setting the low-activity enable signal to be valid when the digital signal is smaller than the activity threshold signal.

15. An image processing system, comprising:
- the image sensor according to claim 1; and
- a computing device coupled to the image sensor and suitable for processing event data from the image sensor.

* * * * *